UNITED STATES PATENT OFFICE.

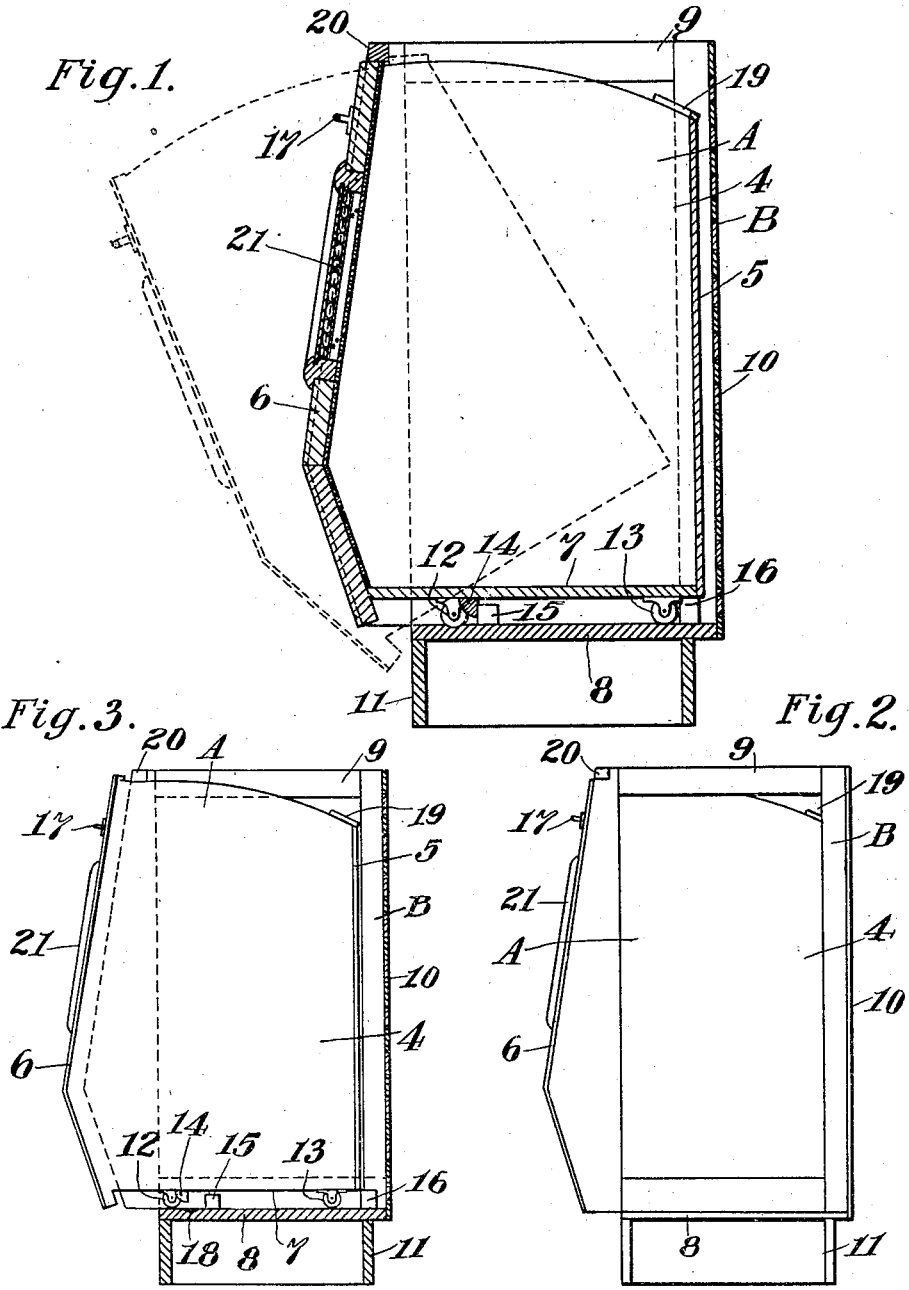

JOHN M. WADDELL, OF GREENFIELD, OHIO.

BIN.

1,246,364.  Specification of Letters Patent.  Patented Nov. 13, 1917.

Application filed March 18, 1915. Serial No. 15,260.

*To all whom it may concern:*

Be it known that I, JOHN M. WADDELL, a citizen of the United States of America, and resident of Greenfield, county of Highland, State of Ohio, have invented certain new and useful Improvements in Bins, of which the following is a specification.

This invention relates to improvements in bins and particularly to bins of the class in which the receptacle may be tilted to render the interior thereof accessible, and to change the center of gravity when the receptacle is moved to the accessible position, whereby the bin may be maintained in its open or closed position.

An object of my invention is to produce an improved bin in which the tilting receptacle may be readily removed from its mounting casing and in which the center of gravity of the receptacle is not changed during the operation of removing the receptacle from the casing.

A further object of my invention is to produce a bin in which improved means are employed for mounting the receptacle during the tilting operation.

These and other objects are attained in the bin construction described in the following specification and illustrated in the accompanying drawings in which;

Figure 1 is a sectional view of a bin having a receptacle embodying my invention, located in its mounting casing which is also shown in section.

Fig. 2 is a side elevation of a bin embodying my invention.

Fig. 3 is a view partially in section and partially in elevation of a bin embodying my invention, with the receptacle somewhat removed from the casing which is shown in section for convenience of illustration.

The bin comprises an open top receptacle A having sides 4, a back 5, a front 6, and a bottom 7; and a casing B which consists of a bottom 8, side receptacle guides 9, a back 10, and a casing support 11. The receptacle is provided at its bottom with rollers 12 and 13 which are secured to the bottom thereof and which are adapted to roll upon the bottom of the casing. The front rollers 12 are adapted to form a pivot point about which the receptacle may be tipped in moving it from the closed to the open position or vice-versa, and the back rollers 13 are adapted to support the weight of the receptacle and its contents when the receptacle is moved to the back of the casing as shown in Fig. 1.

In order to seal the receptacle to prevent mice from entering the bin from between the bottoms 7 and 8 and between the back 5 and 10 of the receptacle and casing respectively, I have provided stops 14 and 15 which extend from one receptacle guide 9 to the opposite receptacle guide 9 and which are adapted to engage one another. The stop 14 is preferably secured to the bottom of the receptacle and the stop 15 is preferably secured to the bottom of the casing as shown in Fig. 1. A stop 16 is provided at the rear of the casing for the purpose of aiding the roller 13 in supporting the receptacle when it is located entirely within the casing as shown in Fig. 2.

In order to prevent the bottom part of the receptacle from moving forwardly when it is moved to its tilted position by means of the handle 17 as shown in Fig. 1, a recess 18 is formed in the bottom 8, which is adapted to receive the lower portion of the roller 12. This prevents the roller from moving forwardly and also prevents the roller from moving backwardly when the receptacle is tilted. In the tilting operation therefore the roller 12 coöperates with the recess 18 in preventing backward movement of the bottom of the receptacle. In order to prevent the top part of the receptacle from moving too far and in order to prevent it from falling out of the casing when it is tilted, I have provided a stop 19 which is secured to the top rear edge of the receptacle and is adapted to abut a brace 20 which extends from one side guide 9 to the opposite side guide.

The front of the receptacle is brought forwardly to present a somewhat bulged appearance. The purpose of this construction is to enable one to see the contents of the display front 21 and also to enable a great proportion of the contents of the receptacle to be distributed in front of the roller 12 so that its center of gravity will be located more toward the front thereof. This permits of a more easy tilting operation and of a consequently more rapid change of position of the center of gravity as the receptacle is tilted. As shown in Fig. 1 the greater proportion of the contents of the receptacle will be located back of the roller 12 when the receptacle is in its normal position, while when it is tipped the greater proportion of its contents will be located to the front of the roller 12.

The rollers 12 and 13 being secured to the bottom of the receptacle are adapted to be moved outwardly when it is being removed from the casing, and to roll upon the bottom 8 of the casing thereby preventing any change of center of gravity, as shown in Fig. 3. In removing the receptacle it is but necessary to move it bodily toward the front of the casing thereby lifting or rolling the roller 12 out of its mounting recess 18. When the receptacle is moved as far toward the front as possible, the roller leaves the bottom 8, the front being supported by the person removing the receptacle, and the rear being supported by the roller 13. After the roller 13 has been moved forwardly to the front edge of the bottom 8 of the casing, the receptacle is lifted from the casing to the floor and the rollers furnish ample means of rolling the receptacle from one position to another in order to clean it, to fill it and in order to bring it back to its mounting casing. In locating the bins in position in the store, the casings of adjacent bins are located alongside of one another to form a continuous casing with separate compartments adapted to receive a receptacle in each compartment. In locating the casings in position, they may be secured together in any suitable manner as by providing continuous strips across their tops in order to support smaller bins, or shelving for articles of merchandise.

What I claim is:

A bin comprising a casing having a transverse bar or stop located upon its bottom adjacent to its forward edge, and recesses in front of said bar or stop, and a receptacle having upon its bottom, front and rear rollers adapted to roll upon the bottom of the casing, the front rollers being adapted to occupy the recesses when the receptacle is in its rearward position and a transverse strip positioned upon the bottom of the receptacle so that as the rollers enter the recesses the weight of the receptacle causes the strip to contact with the stop.

In testimony whereof, I have hereunto subscribed my name this 26th day of February, 1915.

JOHN M. WADDELL.

Witnesses:
 H. W. ELLIOTT,
 C. W. CROSS.

Copies of this patent may be obtained for five cents each, by addressing the "Commissioner of Patents, Washington, D. C."